United States Patent
Tan et al.

(10) Patent No.: US 7,464,255 B1
(45) Date of Patent: Dec. 9, 2008

(54) USING A SHUFFLE UNIT TO IMPLEMENT SHIFT OPERATIONS IN A PROCESSOR

(75) Inventors: Teik-Chung Tan, Austin, TX (US); Kelvin Domnic Goveas, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 496 days.

(21) Appl. No.: 11/192,153

(22) Filed: Jul. 28, 2005

(51) Int. Cl.
*G06F 15/00* (2006.01)
(52) U.S. Cl. ....................................... 712/300
(58) Field of Classification Search ................... 712/300
See application file for complete search history.

(56) References Cited

U.S. PATENT DOCUMENTS

| | | | |
|---|---|---|---|
| 5,872,943 A | 2/1999 | Pickett et al. |
| 5,901,076 A | 5/1999 | Lynch |
| 5,926,407 A | 7/1999 | Mahurin |
| 5,991,786 A | 11/1999 | Mahurin |
| 6,006,244 A | 12/1999 | Mahurin |
| 6,035,310 A | 3/2000 | Mahurin |

2006/0015702 A1* 1/2006 Khan et al. .................. 712/22

OTHER PUBLICATIONS

Hewlett-Packard, "PA-RISC 2.0," 1995, pp. 7-40, 41, 42, 43, 44, 45, 48, 49, 50, 51, 108, 109.*
U.S. Appl. No. 11/197,705, filed Aug. 4, 2005.

* cited by examiner

*Primary Examiner*—David J Huisman
(74) *Attorney, Agent, or Firm*—Meyertons Hood Kivlin Kowert & Goetzel, P.C.; Rory D. Rankin (57) ABSTRACT

A method and mechanism for performing shift operations using a shuffle unit. A processor includes a shuffle unit configured to perform shuffle operations responsive to shuffle instructions. The shuffle unit is adapted to support shift operations as well. In response to determining a shuffle instruction is received, selected bits of an immediate value of the shuffle instruction are used to generate byte selects for relocating bytes of a source operand. In response to determining the instruction is a shift instruction, the shuffle unit performs an arithmetic operation on a first and second value, where the first value corresponds to a particular destination byte position, and the second value corresponds to the immediate value. The result of the arithmetic operation comprises a byte select which selects one of the bytes of a source operand for conveyance to the particular destination byte position. In the event a destination byte position should be cleared by the shift operation, the output for the particular destination byte position is forced to zero.

17 Claims, 5 Drawing Sheets

USING A SHUFFLE UNIT TO IMPLEMENT SHIFT OPERATIONS IN A PROCESSOR

BACKGROUND OF THE INVENTION

1. Field of the Invention

This invention is related to the field of processors and computer systems and, more particularly, to performing shift operations in a processor.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Included among the x86 instructions which are commonly implemented, are shuffle instructions which are configured to relocate or reorder portions of an operand within itself. Given these shuffle instructions are part of the x86 instruction set, processor architectures which support the x86 instruction set generally include circuitry to perform shuffles.

In addition to shuffle instructions, the x86 instruction set includes a number of shift instructions as well. Those skilled in the art are well aware of the wide ranging uses of shift operations within processors generally. As processors have advanced, and the applications to which they are applied become more sophisticated, extensions to the instruction set have been introduced. For example, the x86 Streaming SIMD Extensions (SSE) instruction set has been extended to include 128-bit shift instructions. While such instructions may be beneficial for particular applications, efficiently supporting such instructions in a given processor may present some challenges. For example, even in an x86 architecture which has been configured to support 64-bit operands, a 128-bit shift operation may generally require circuitry to logically concatenate at least two 64-bit registers in order to accommodate a 128-bit operand. Depending upon the implementation, such an approach may introduce additional latencies into the critical path.

In view of the above, an effective method and mechanism for performing shift operations is desired.

SUMMARY OF THE INVENTION

Generally contemplated are a method and mechanism for performing shift operations in a processor.

A method and mechanism for performing shift operations using a shuffle unit are contemplated. In one embodiment, a processor includes a shuffle unit configured to perform shuffle operations responsive to shuffle instructions. The shuffle unit is further adapted to support shift operations in addition to the shuffle operations. Received instructions which are determined to be either a shuffle instruction or certain shift instructions are both routed to the shuffle unit. If a shuffle instruction is received, the shuffle unit is configured to use selected bits of an immediate value of the shuffle instruction to generate byte selects. The generated byte selects are used for relocating, or permuting, bytes of a source operand. If it is determined that the received instruction is a shift instruction, the shuffle unit performs an arithmetic operation on a first and second operand, where the first operand corresponds to a particular destination byte position, and the second operand corresponds to the immediate value. The result of the arithmetic operation may then be used as a byte select which selects one of the bytes of a source operand for conveyance to the particular destination byte position in a manner similar to that of the shuffle operation. In the event a destination byte position should be cleared by the shift operation, the output for the particular destination byte position is forced to zero.

These and other embodiments will become apparent upon reference to the following description and accompanying drawings.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
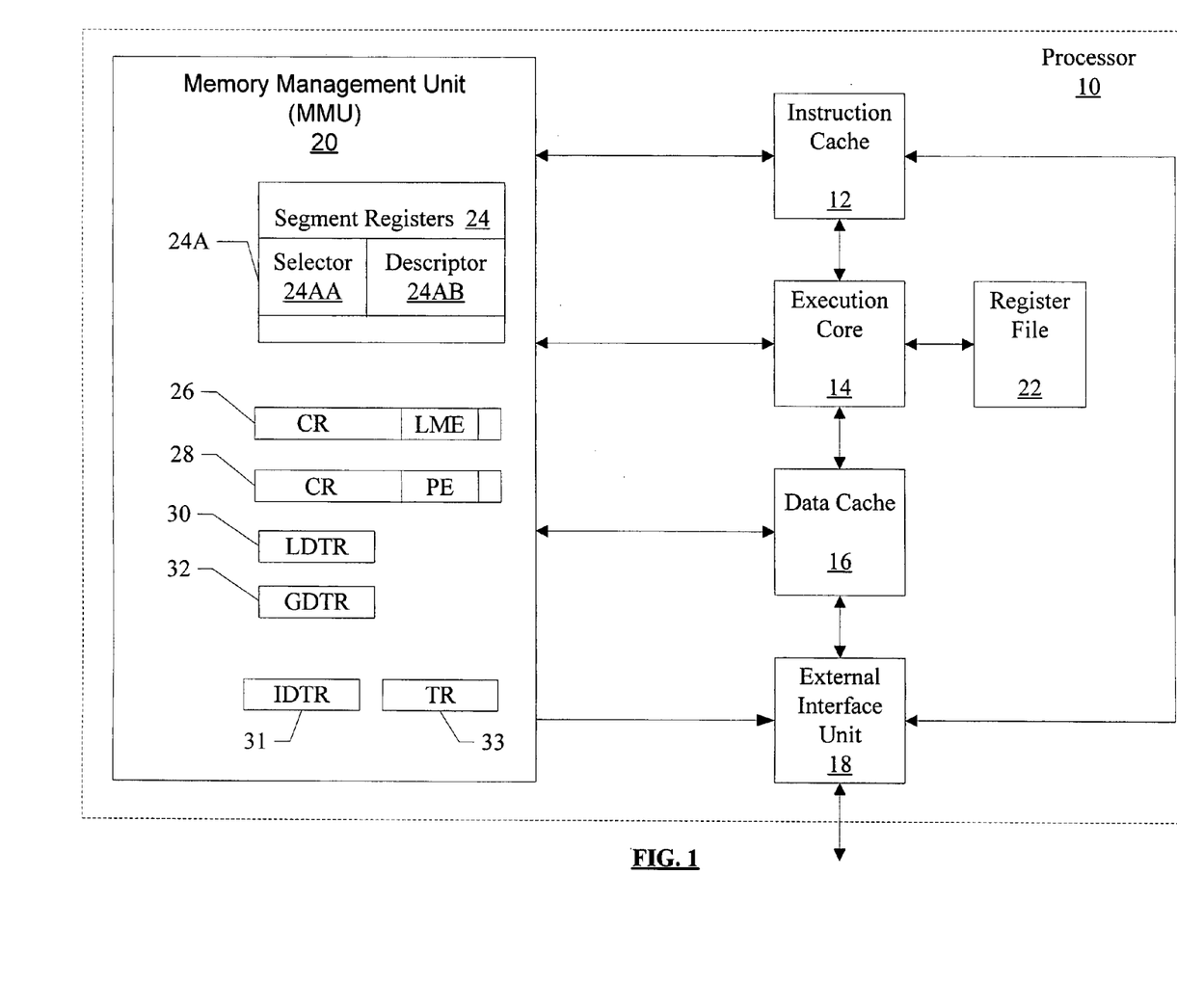
FIG. 1 is a block diagram of one embodiment of a processor.

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, an interrupt descriptor table register (IDTR) 31, a global descriptor table register (GDTR) 32, and a task register (TR) 33. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Generally speaking, processor 10 employs a processor architecture compatible with the x86 architecture and including additional architectural features to support 64 bit processing. Processor 10 is configured to establish an operating mode"

in response to information stored in a code segment descriptor corresponding to the currently executing code and in further response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands, and may also specify the size of the physical address. Alternatively, the size of the physical address may be independent of the default address size and may instead be dependent on the Long Mode Enable (LME) bit described below (e.g. the physical address may be 32 bits if the LME bit is clear and an implementation-dependent size greater than 32 bits and less than 64 bits if the LME bit is set) or on another control bit (e.g. the physical address extension (PAE) bit in another control register). As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define access control and status for a segment of memory. A "segment descriptor table" is a table in memory having multiple entries, each entry capable of storing a segment descriptor.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are non-cacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable an operating mode in which the default address size is greater than 32 bits ("32/64 mode") as well as certain compatibility modes for the 32 bit and 16 bit operating modes. The default operand size may be 32 bits in 32/64 mode, but instructions may override the default 32 bit operand size with a 64 bit operand size when desired. If the LME indication is in an enabled state, then 32/64 mode may be used in addition to 32 bit and 16 bit modes. If the LME indication is in a disabled state, then 32/64 mode is disabled. In one embodiment, the default address size in 32/64 mode may be implementation-dependent but may be any value up to and including 64 bits. Furthermore, the size of the virtual address may differ in a given implementation from the size of the physical address in that implementation.

It is noted that enable indications may be described herein as bits with the enabled state being the set state of the bit and the disabled state being the cleared state of the bit. However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and the remainder of the segment selector is used as an index into the selected table.

When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change. Segment descriptor tables are described in more detail below.

In one embodiment, only the CS segment register is used in 32/64 mode. The data segment registers are ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

In addition to local descriptor tables and global descriptor tables, another data structure, called an Interrupt Descriptor Table (IDT), is used for handling interrupts. A pointer to the IDT is maintained in the Interrupt Descriptor Table Register (IDTR) 31. Another data structure which is utilized in the handling of interrupts is the Task State Segment (TSS). The TSS includes information required for performing task switches, such as stack pointers and an I/O map base address. Each task may have its own TSS. Task Register 33 contains a pointer to the TSS corresponding to the current task. Interrupt handling is discussed further below.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice.

Register file 22 may include 64 bit registers which may be accessed as 64 bit, 32 bit, 16 bit, or 8 bit registers as indicated by the operating mode of processor 10 and any overrides for a particular instruction. The registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Register file 22 may further include the RIP register which may be a 64 bit version of the EIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a write-back caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

Figure 2:
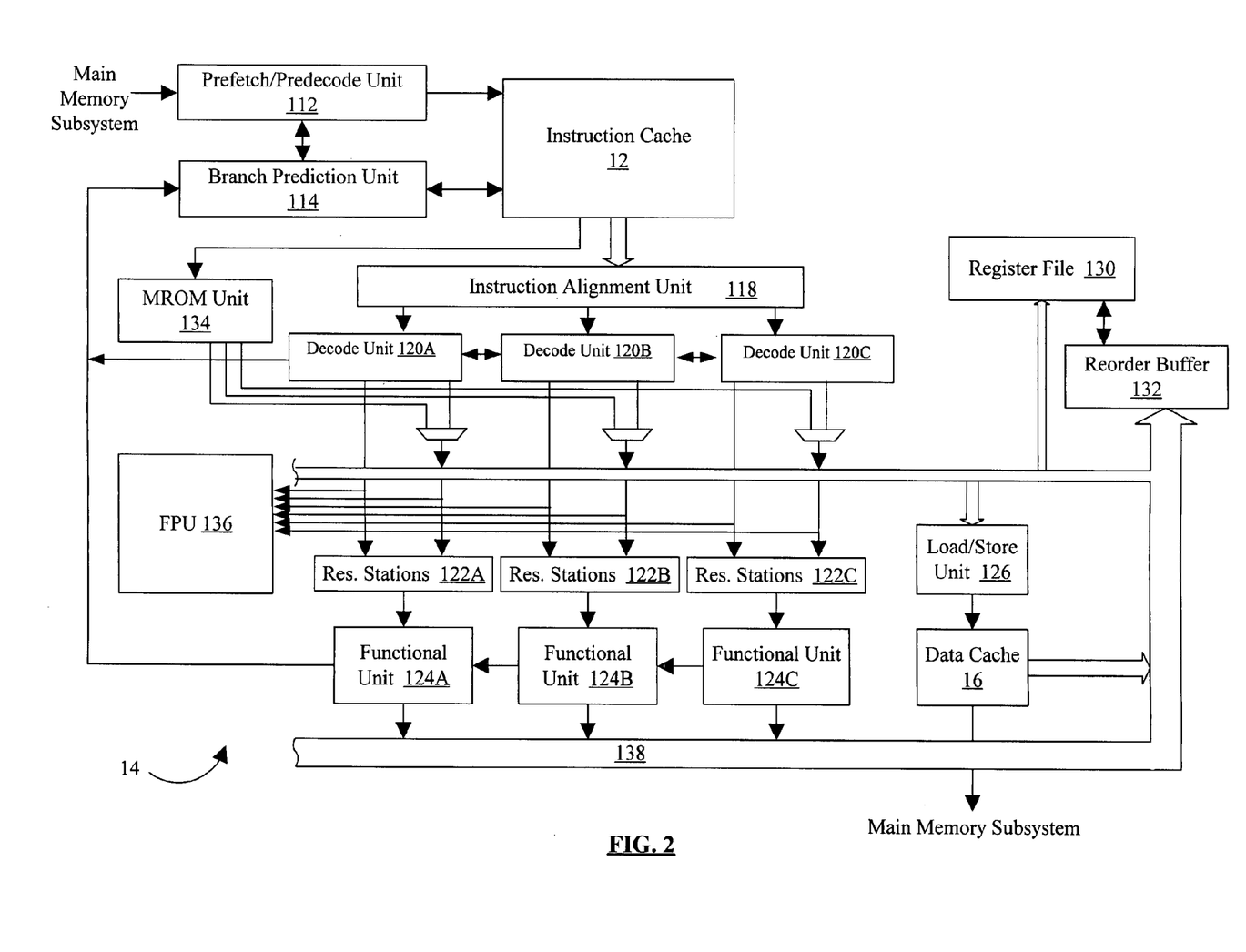
FIG. 2 illustrates one embodiment of a processing core.

FIG. 2 depicts a block diagram of one embodiment of an execution core 14 which may be included in the processor of FIG. 1. In the example shown, core 14 is coupled to the instruction cache 14, data cache 16, and register file 30. Other embodiments are possible and contemplated. As shown in FIG. 1, core 14 includes a prefetch/predecode unit 112, a branch prediction unit 114, an instruction cache 12, an instruction alignment unit 118, a plurality of decode units 120A-120C, a plurality of reservation stations 122A-122C, a plurality of functional units 124A-124C, a load/store unit 126, a data cache 16, a register file 130, a reorder buffer 132, an MROM unit 134. Elements referred to herein with a particular reference number followed by a letter will be collectively referred to by the reference number alone. For example, decode units 120A-120C will be collectively referred to as decode units 120.

Prefetch/predecode unit 112 is coupled to receive instructions, such as via a bus interface unit (not shown), and is further coupled to instruction cache 12 and branch prediction unit 114. Similarly, branch prediction unit 114 is coupled to instruction cache 12. Still further, branch prediction unit 114 is coupled to decode units 120 and functional units 124. Instruction cache 12 is further coupled to NROM unit 134 and instruction alignment unit 118. Instruction alignment unit 118 is in turn coupled to decode units 120. Each decode unit 120A-120C is coupled to load/store unit 126 and to respective reservation stations 122A-122C. In addition, each of the decode units 120 and the MROM unit 134 are coupled to a respective 2-1 multiplexor (mux) which conveys an input from either the MROM unit 134 or a decode unit 120 to one of the reservations stations 122. In addition, each of the decode units 120 are further coupled to the FPU 136. In one embodiment, MROM unit 134 may output 3 microcode ops. The 2-1 mux then selects between the decode unit 120 output and each ucode op. The output of the 2-1 mux is sent both to an integer reservation station and the FPU. Reservation stations 122A-122C are further coupled to respective functional units 124A-124C. Additionally, decode units 120 and reservation stations 122 are coupled to register file 130 and reorder buffer 132. Functional units 124 are coupled to load/store unit 126, register file 130, and reorder buffer 132 as well. Data cache 16 is coupled to load/store unit 126 Finally, MROM unit 134 may be coupled to decode units 120.

Instruction cache 16 is a high speed cache memory provided to store instructions. Instructions are fetched from instruction cache 16 and dispatched to decode units 120. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 112. Instructions may be prefetched prior to the request thereof from instruction cache 16 in accordance with a prefetch scheme. A variety of prefetch schemes may be employed by prefetch/predecode unit 112. As prefetch/predecode unit 112 transfers instructions to instruction cache 16, prefetch/predecode unit 112 may generate predecode data corresponding to the instructions. For example, in one embodiment, prefetch/predecode unit 112 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 120 or whether the instruction is executed by invoking a microcode procedure controlled by MROM unit 134. Still further, prefetch/predecode unit 112 may be configured to detect branch instructions and to store branch prediction information corresponding to the branch instructions into branch prediction unit 114. Other embodiments may employ any suitable predecode scheme or no predecode, as desired.

One encoding of the predecode tags for an embodiment of core 14 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 120 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 120 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 120. MROM instructions are executed by invoking MROM unit 134. More specifically, when an MROM instruction is encountered, MROM unit 134 parses and issues the instruction into a subset of defined fast path instructions to effectuate the desired operation. MROM unit 134 dispatches the subset of fast path instructions to decode units 120.

Processor 10 employs branch prediction in order to speculatively fetch instructions subsequent to conditional branch instructions. Branch prediction unit 114 is included to perform branch prediction operations. In one embodiment, branch prediction unit 114 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 112 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 114 may determine which branch target addresses to select for forming a branch prediction.

Decode units 120 and functional units 124 provide update information to branch prediction unit 114. Decode units 120 detect branch instructions which were not predicted by branch prediction unit 114. Functional units 124 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 114 may be coupled to reorder buffer 132 instead of decode units 120 and functional units 124, and may receive branch misprediction information from reorder buffer 132. A variety of suitable branch prediction algorithms may be employed by branch prediction unit 114.

Instructions fetched from instruction cache 16 are conveyed to instruction alignment unit 118. As instructions are fetched from instruction cache 16, the corresponding predecode data is scanned to provide information to instruction alignment unit 118 (and to MROM unit 134) regarding the instructions being fetched. Instruction alignment unit 118 utilizes the scanning data to align an instruction to each of decode units 120. In one embodiment, instruction alignment unit 118 aligns instructions from three sets of eight instruction bytes to decode units 120. Decode unit 120A receives an instruction which is prior to instructions concurrently received by decode units 120B and 120C (in program order). Similarly, decode unit 120B receives an instruction which is prior to the instruction concurrently received by decode unit 120C in program order. In some embodiments, (e.g. embodiments employing fixed-length instruction sets), the instruction alignment unit 118 may be eliminated.

Decode units 120 are configured to decode instructions received from instruction alignment unit 118. Register operand information is detected and routed to register file 130 and reorder buffer 132. Additionally, if the instructions require one or more memory operations to be performed, decode units 120 dispatch the memory operations to load/store unit 126. Each instruction is decoded into a set of control values for functional units 124, and these control values are dispatched to reservation stations 122 along with operand address information and displacement or immediate data which may be included with the instruction. In one particular embodiment, each instruction is decoded into up to two operations which may be separately executed by functional units 124A-124C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 130. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 132.

The decoded instructions provided at the outputs of decode units 120 are routed directly to respective reservation stations 122. In one embodiment, each reservation station 122 is capable of holding instruction information (e.g. decoded instructions as well as operand values, operand tags and/or immediate data) for up to six pending instructions awaiting issue to the corresponding functional unit. It is noted that for the embodiment of FIG. 1, each reservation station 122 is associated with a dedicated functional unit 124. Accordingly, three dedicated "issue positions" are formed by reservation stations 122 and functional units 124. In other words, issue position 0 is formed by reservation station 122A and functional unit 124A. Instructions aligned and dispatched to reservation station 122A are executed by functional unit 124A. Similarly, issue position 1 is formed by reservation station 122B and functional unit 124B; and issue position 2 is formed by reservation station 122C and functional unit 124C.

Upon decode of a particular instruction, if a required operand is a register location, register address information is routed to reorder buffer 132 and register file 130 simultaneously. The register file 130 comprises storage locations for each of the architected registers included in the instruction set implemented by the processor 10. Additional storage locations may be included within register file 130 for use by MROM unit 134. Reorder buffer 132 contains temporary storage locations for results which change the contents of these registers to thereby allow out of order execution. A temporary storage location of reorder buffer 132 is reserved for each instruction which, upon decode, is determined to modify the contents of one of the real registers. Therefore, at various points during execution of a particular program, reorder buffer 132 may have one or more locations which contain the speculatively executed contents of a given register. If following decode of a given instruction it is determined that reorder buffer 132 has a previous location or locations assigned to a register used as an operand in the given instruction, the reorder buffer 132 forwards to the corresponding reservation station either: 1) the value in the most recently assigned location, or 2) a tag for the most recently assigned location if the value has not yet been produced by the functional unit that will eventually execute the previous instruction. If reorder buffer 132 has a location reserved for a given register, the operand value (or reorder buffer tag) is provided from reorder buffer 132 rather than from register file 130. If there is no location reserved for a required register in reorder buffer 132, the value is taken directly from register file 130. If the operand corresponds to a memory location, the operand value is provided to the reservation station through load/store unit 126.

In one particular embodiment, reorder buffer 132 is configured to store and manipulate concurrently decoded instructions as a unit. This configuration will be referred to herein as "line-oriented". By manipulating several instructions together, the hardware employed within reorder buffer 132 may be simplified. For example, a line-oriented reorder buffer included in the present embodiment allocates storage sufficient for instruction information pertaining to three instructions (one from each decode unit 120) whenever one or more instructions are dispatched by decode units 120. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 130 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 130 and freeing the corresponding storage is referred to as "retiring" the instructions. It is further noted that any reorder buffer configuration may be employed in various embodiments of processor 10.

As noted earlier, reservation stations 122 store instructions until the instructions are executed by the corresponding functional unit 124. An instruction is selected for execution if: (i) the operands of the instruction have been provided; and (ii) the operands have not yet been provided for instructions which are within the same reservation station 122A-122C and which are prior to the instruction in program order. It is noted that when an instruction is executed by one of the functional units 124, the result of that instruction is passed directly to any reservation stations 122 that are waiting for that result at the same time the result is passed to update reorder buffer 132 (this technique is commonly referred to as "result forwarding"). An instruction may be selected for execution and passed to a functional unit 124A-124C during the clock cycle that the associated result is forwarded. Reservation stations 122 route the forwarded result to the functional unit 124 in this case. In embodiments in which instructions may be decoded into multiple operations to be executed by functional units 124, the operations may be scheduled separately from each other.

In one embodiment, each of the functional units 124 is configured to perform integer arithmetic operations of addition and subtraction, as well as shifts, rotates, logical operations, and branch operations. The operations are performed in response to the control values decoded for a particular instruction by decode units 120. It is noted that a floating point unit (not shown) may also be employed to accommodate floating point operations. The floating point unit may be operated as a coprocessor, receiving instructions from MROM unit 134 or reorder buffer 132 and subsequently communicating with reorder buffer 132 to complete the instructions. Additionally, functional units 124 may be configured to perform address generation for load and store memory operations performed by load/store unit 126. In one particular embodiment, each functional unit 124 may comprise an address generation unit for generating addresses and an execute unit for performing the remaining functions. The two units may operate independently upon different instructions or operations during a clock cycle.

Each of the functional units 124 also provides information regarding the execution of conditional branch instructions to the branch prediction unit 114. If a branch prediction was incorrect, branch prediction unit 114 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 126 and reorder buffer 132. It is further noted that branch execution results may be provided by functional units 124 to reorder buffer 132, which may indicate branch mispredictions to functional units 124.

Results produced by functional units 124 are sent to reorder buffer 132 if a register value is being updated, and to load/store unit 126 if the contents of a memory location are changed. If the result is to be stored in a register, reorder buffer 132 stores the result in the location reserved for the value of the register when the instruction was decoded. A plurality of result buses 138 are included for forwarding of results from functional units 124 and load/store unit 126. Result buses 138 convey the result generated, as well as the reorder buffer tag identifying the instruction being executed.

Load/store unit 126 provides an interface between functional units 124 and data cache 12. In one embodiment, load/store unit 126 is configured with a first load/store buffer having storage locations for data and address information for pending loads or stores which have not accessed data cache 12 and a second load/store buffer having storage locations for data and address information for loads and stores which have accessed data cache 12. For example, the first buffer may comprise 12 locations and the second buffer may comprise 132 locations. Decode units 120 arbitrate for access to the load/store unit 126. When the first buffer is full, a decode unit must wait until load/store unit 126 has room for the pending load or store request information. Load/store unit 126 also performs dependency checking for load memory operations against pending store memory operations to ensure that data coherency is maintained. A memory operation is a transfer of data between processor 10 and the main memory subsystem (although the transfer may be accomplished in the data cache 12). Memory operations may be the result of an instruction which utilizes an operand stored in memory, or may be the result of a load/store instruction which causes the data transfer but no other operation.

Data cache 12 is a high speed cache memory provided to temporarily store data being transferred between load/store unit 126 and the main memory subsystem. In one embodiment, data cache 12 has a capacity of storing up to 64 kilobytes of data in an two way set associative structure. It is understood that data cache 12 may be implemented in a variety of specific memory configurations, including a set associative configuration, a fully associative configuration, a direct-mapped configuration, and any suitable size of any other configuration.

It is noted that, while the embodiment of FIG. 1 is a superscalar implementation, other embodiments may employ scalar implementations. Furthermore, the number of functional units may be varied from embodiment to embodiment. Any execution circuitry for executing fast path and microcode (e.g. MROM) instructions may be used. Other embodiments may use a centralized reservation station rather than the individual reservation stations shown in FIG. 1. Furthermore, other embodiments may employ a central scheduler rather than the reservation stations and reorder buffer shown in FIG. 1.

As already mentioned, certain instructions in the x86 instruction set are fairly complicated. In one embodiment of microprocessor 10, such instructions include more complex operations than the hardware included within a particular functional unit 124A-124C is configured to perform. Such instructions generally correspond to MROM instructions. Further, when expanding an architecture new instructions may be added to the instruction set. New instructions may often require specific new types of operands. Such operands may be of various data widths, and may be compatible with data types (e.g. integer, floating point, etc.) that may be operated on by the processor's execution unit(s). One type of instruction that may be added is a SIMD (single instruction multiple data) instruction. SIMD instructions are instructions which may have operands comprising at least two sub-operands, wherein each of the sub-operands is an independent value. For example, a SIMD operand may be a 32-bit value comprising four 8-bit values. The SIMD instruction may define an operation to be performed on its sub-operands. The operation may be performed on each sub-operand independently of the other sub-operands. For example, an ADD instruction on 32-bit SIMD operands, each comprising four 8-bit sub-operands will result in four 8-bit addition operations. Carry values generated by adding the 8-bit sub-operands are not carried from one sub-operand to the next.

Figure 3:
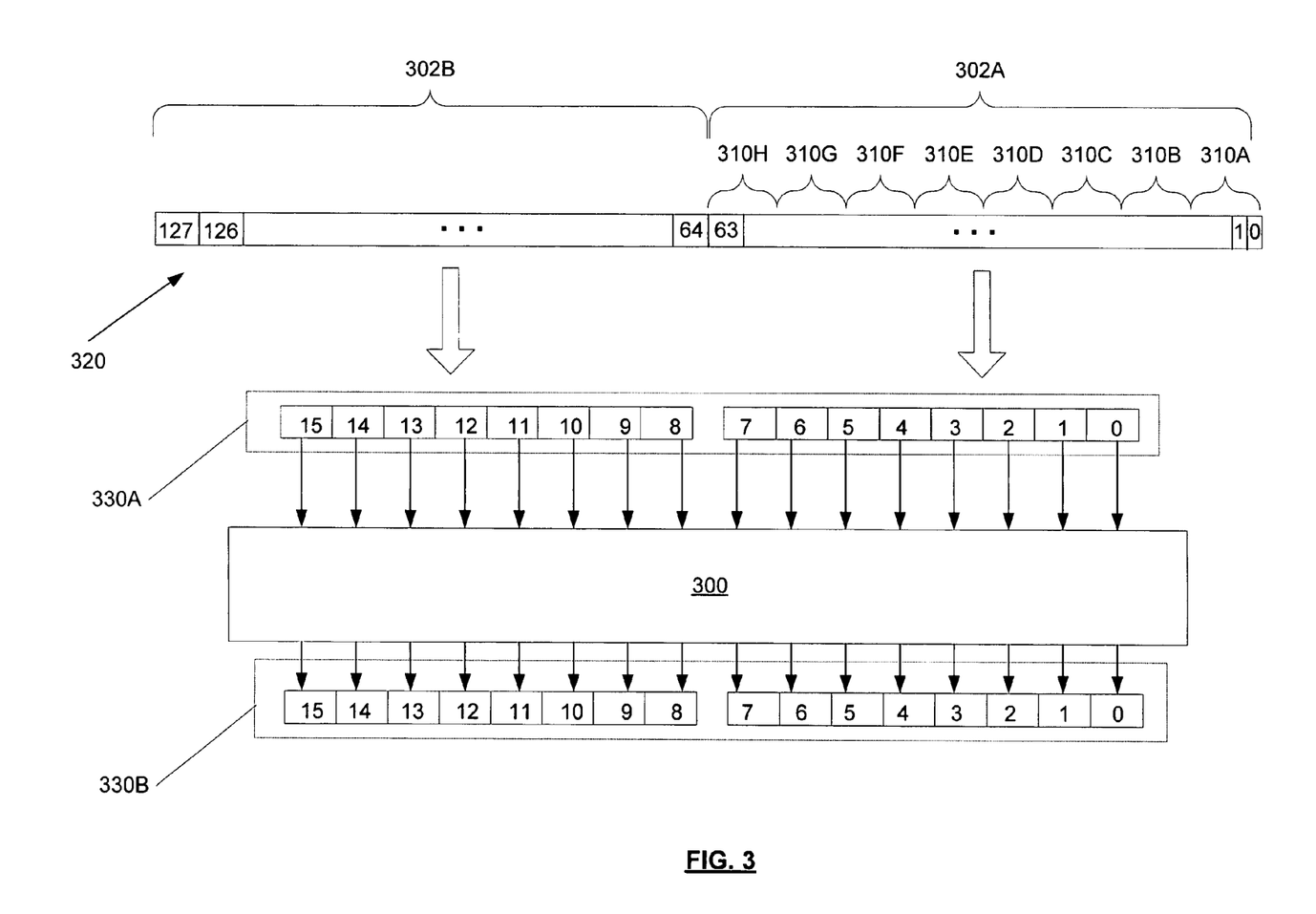
FIG. 3 illustrates one embodiment of a shuffle unit and general cross-bar type operation.

Turning now to FIG. 3, one embodiment of an overview of the operation of a shuffle unit 300 is depicted. As described above, the x86 instruction set may include shuffle instructions which are operable to permute bytes within a given operand. Accordingly, architectures which support shuffle instructions will generally include a mechanism to perform such operations. In one embodiment, a 64 bit architecture may support a 128-bit operand size by concatenating two 64 bit registers. FIG. 3 illustrates an embodiment wherein a 128 bit operand 320 comprises the concatenation of two 64 bit registers 302A-302B. As illustrated, register 302A comprises eight bytes 310A-310H. Register 302B also comprises eight bytes. For ease of illustration, block 330A shows the contents of registers 302 with its corresponding bytes numbered. Therefore, byte 310A is represented by byte "0", byte 310B is represented by byte "1", and so on. Also illustrated is a block 330B which depicts the contents of register 302 after a shuffle operation. Byte positions are labeled in the post operation block 330B as well. Execution of a shuffle instruction then takes each byte of the source 330A and relocates it to a new byte location in the destination 330B. Therefore, byte 12 of the source 330A could be relocated to byte 4 in the destination 330B. As any byte in the source 330A may be relocated to a new byte position in the destination 330B, shuffle unit 300 may, in effect, implement a crossbar. Other ways of implementing the shuffle unit are possible and are contemplated.

Figure 4:
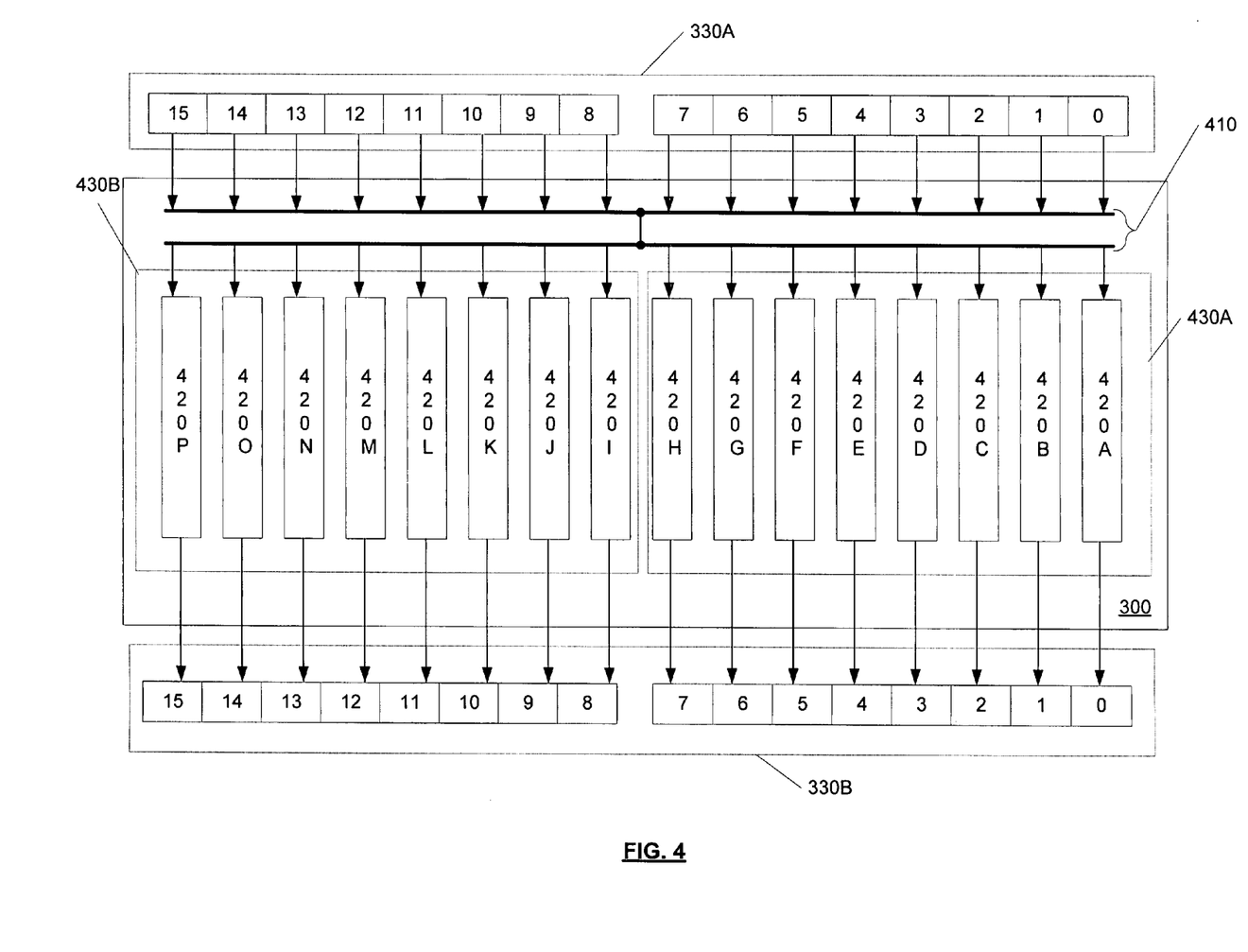
FIG. 4 illustrates one embodiment of a shuffle unit and general cross-bar type operation.

FIG. 4 provides one possible implementation of the register(s) 330 and shuffle unit 300 of FIG. 3. As shown in FIG. 4, the shuffle unit 300 includes an array of byte-size crossbars 420A-420P corresponding to each of the bytes of the operand. In the embodiment shown, these units are generally grouped into two groups 430A and 430B, with each group 430 corresponding to one of the 64 bit sources (e.g., source registers 302A and 302B of FIG. 3). Other groupings are possible and are contemplated. Generally speaking, each unit 420 is coupled to receive all bytes of the source 330A via bus 410. Each unit 420 is further coupled to convey one of the received bytes to the destination 330B. Generally speaking, the destination 330B is the same register(s) as the source 330A. As may be appreciated, there may exist latches or other buffers between the units 420 and the destination 300B.

As mentioned above, the x86 instruction set may also include shift instructions which are operable to perform byte-wise shifts on a 128-bit operand. For example, instructions operable to shift a double quadword right or left may be included. Two such instructions are the Packed Shift Left Logical Double Quadword (PSLLDQ), and the Packed Shift Right Logical Double Quadword (PSRLDQ). The format of these instructions is as follows:

PSLLDQ xmm1, xmm2, imm8

PSRLDQ xmm1, xmm2, imm8 where xmm2 identifies a source 128 bit register, xmm1 identifies the destination 128 bit register, and imm8 indicates a number of bytes to shift the value in the identified register. As noted above, the identified 128 bit operand may comprise the logical concatenation of two or more smaller registers, though "true" 128 bit registers are contemplated as well. During shifting, bytes that are emptied by the shift are filled with zeroes. Consequently, a shift value greater than 15 clears the register to all zeroes.

Figure 5:
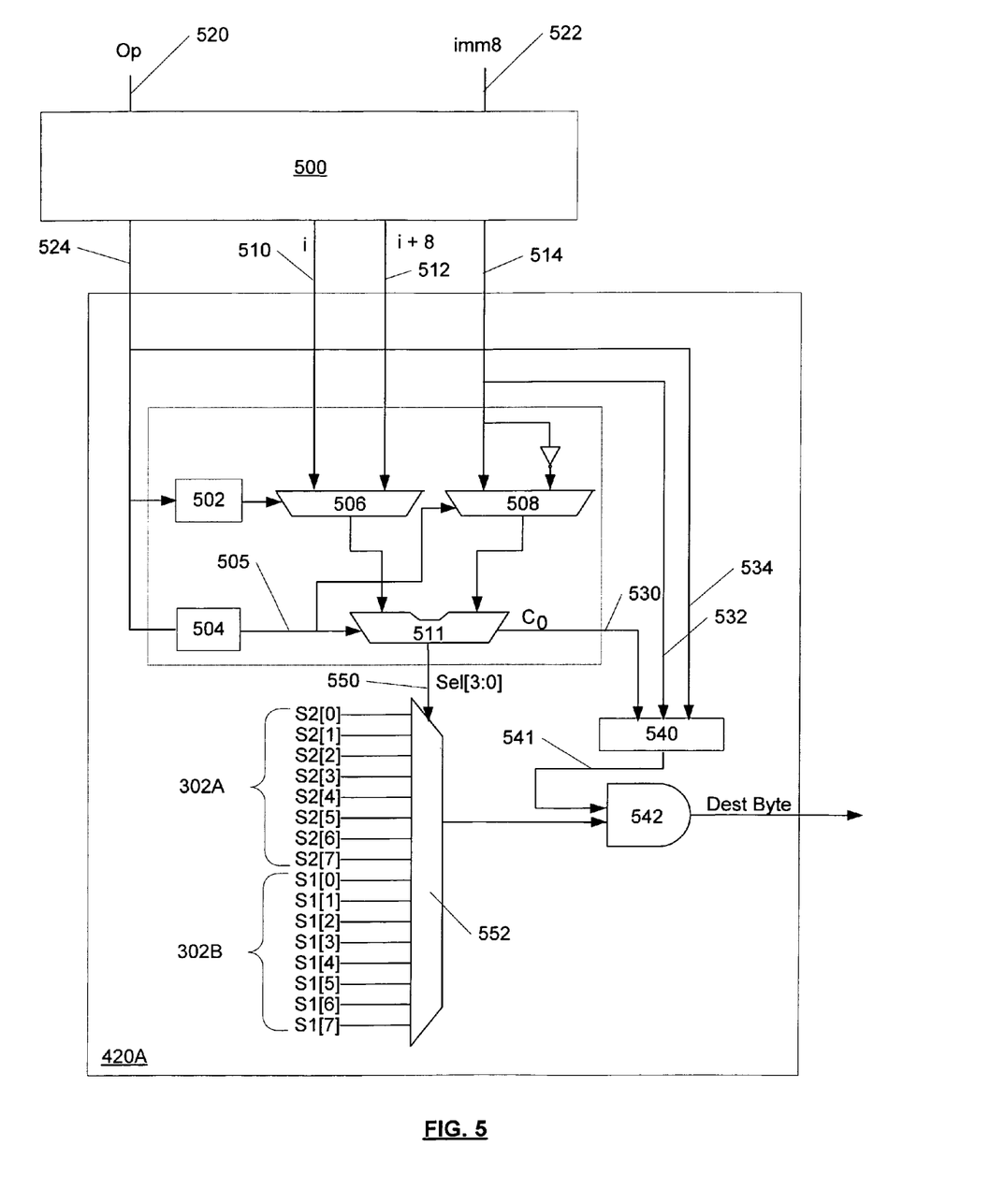
FIG. 5 is a block diagram of one embodiment of a shuffle unit.

Generally speaking, supporting new instructions such as 128 bit shift instructions requires the addition of new logic to the processor. In one embodiment, shuffle unit 300 may be adapted to perform both shuffle and shift operations. Turning to FIG. 5, one embodiment of a unit 420A as shown in FIG. 3 is depicted. Referring to FIG. 3, it can be seen that unit 420A of the shuffle unit 300 is configured to convey the value for destination byte position 0. Generally speaking, each of the units 420 is configured to translate a shift instruction into multiple shuffle selects which are used to determine a new location within a destination (if any) of each of the source bytes.

As mentioned above, shuffle unit 300 may be adapted to perform both shuffle and shift operations. As an example, depending upon the received instruction, the circuitry depicted in FIG. 5 depicts the generation of a destination byte (byte position 0) corresponding to either a shuffle or shift instruction. FIG. 5 depicts unit 420A which is coupled to receive data from sources 302A and 302B. As noted in FIG. 3, sources 302 may each comprise eight bytes of data. In the example embodiment of FIG. 5, a 16-to-1 multiplexor (mux) 552 is coupled to each of the source bytes 302. The output of the mux 552 is coupled to an AND gate 542 which conveys the data for byte position "0". Unit 420B would similarly convey the data for byte position "1", unit 402C would convey the data for byte position "2", and so on. Generally speaking, select signal 550 selects one of the source bytes 302 for conveyance as the destination byte for the byte position corresponding to the given unit 420 (unit 420A in this example).

In FIG. 5, control unit 500 is coupled to data corresponding to either a shuffle instruction or a shift instruction. As shown, control unit 500 receives an opcode 520 and corresponding immediate (imm8) value 522. While control unit 500 is depicted as being separate from unit 420A, it may in fact be part of unit 420A. It is noted that control unit 500 could also be shared between all muxes 420A-420P. Similarly, logic components depicted within 420A may be included in control unit 500. If the opcode 520 received corresponds to a shuffle instruction, then the control unit 500 identifies from the immediate 522 value which source byte is to be conveyed for this particular unit 420A and the corresponding byte position.

For example, if the operand 520 corresponds to a packed shuffle word (PSHUFW) instruction, the eight bit immediate value 522 includes four pairs of bits, where each pair identifies a source word. As the unit 420A in FIG. 5 is configured to convey only a single byte, the control unit 500 is configured to select the byte in the identified word which corresponds to the byte position belonging to unit 420A. Therefore, if the least two significant bits of the immediate value 522 (i.e., imm8[1:0]) are "01", then the identified source word that corresponds to byte location 0 is word 1. Viewing the source in terms of bytes, word 1 of the source comprises bytes 2 and 3 of the source. Therefore, source byte 2 (i.e., S2[2]) will be selected for conveyance by unit 420A as byte 0. In addition, similarly configured unit 420B (not shown in FIG. 5) will convey source byte 3 (i.e., S2[3]) as the data for byte 1.

As the PSHUFW instruction includes four source words, and each word comprises two bytes, the corresponding byte positions are numbered 0-7. However, each of the two bits of the imm8 value 522 are configured to identify a source word (0-3) for a given destination and not the source bytes. As the unit 420A (and the other units 420) are configured to generate byte selects, the two bits for a given word position must be converted to two separate byte selects. Consequently, word 0 becomes bytes 0-1, word 1 becomes bytes 2-3, word 2 becomes bytes 4-5, and word 3 becomes bytes 6-7. To achieve this, control units for each of the units 420A-420H will effectively group units into pairs of two when a PSHUFW operand is detected. Therefore, units 420A-420B correspond to destination word 0, units 420C-420D correspond to destination word 1, units 420E-420F correspond to destination word 2, and units 420G-420H correspond to destination word 3.

In the example of FIG. 5, signal 510 may be generated to select the byte for the unit 420A. While signal 510 is shown to be coupled to mux 510, logic may be included which simply causes signal 510 to bypass (in the case of a PSHUFW instruction) any intervening logic depicted such that select signal 550 corresponds directly to the generated signal 510. Alternatively, signal 510 may be conveyed to adder 511 which simply adds zero to the value of the signal 510. Various alternatives are possible and are contemplated. Generally speaking, control unit 500 generates signal 510 by taking the value of the two bits of the imm8 522 that correspond to the unit 420A and multiplying it by 2. In this manner, the first byte position of the identified word is determined. Therefore, if the two bits of imm8 522 for this word position (i.e., the destination word position that corresponds to the byte position of unit 420A) are "10" (i.e., word 2), then signal 550 is generated to be equal to "0100" ($4_{10}$) which is the first byte position of word 2. In order to obtain the second byte which corresponds to this word position, unit 420B may be configured to perform a similar multiplication and add "1" to the result (i.e., 2×2+ 1=5). More generally, units 420 which are in an even byte position (e.g., 420A, 420C, 420E, etc.) may simply multiply the source bits by two, while units 420 which are in an odd position (e.g., 420B, 420D, 420F, etc.) may multiply by two and add one to select the second byte of the identified word in a PSHUFW instruction. In one embodiment, the addition of one for each of the odd byte position units 420 may be achieved by the control unit for the corresponding unit 420 setting signal 514 to "1", setting signal 505 to "0", and performing the addition using adder 511.

While in the above example of a PSHUFW instruction only eight source bytes were involved, a packed shuffle doubleword (PSHUFD) instruction references sixteen source bytes. It is noted that in one embodiment, both PSHUFW and PSHUFD instructions have 128-bit operands. In an embodiment wherein the shuffle unit is 64-bits wide, an instruction may be translated and operated upon as two sub-operations, each producing an eight byte results. However, all sixteen source bytes must be considered by each of the sub-operations as any of the source bytes may be selected. In a PSHUFD instruction, the sixteen source bytes are grouped into four doublewords and addressed as such. Accordingly, an immediate value provided in a PSHUFD instruction also includes four sets of two bits each, where each of the two bits references one of four source doublewords. In the example above, the unit 420A was able to generate a byte select by multiplying bits of the immediate value by two. However, such an approach can address no more than eight bytes. Accordingly, a slightly different approach must be used for a PSHUFD instruction.

Referring back to FIG. 5, assume an opcode 520 and immediate value 522 corresponding to a PSHUFD are received. As before, signal 510 is generated by selecting the two bits of the immediate value 522 which correspond to unit 420A and multiplying the value of the two bits by two. In addition, signal 512 is generated to be equal to the value of signal 510 plus 8. In other words, the signals 510 and 512 may be generated to be 0-8, 1-9, 2-10, 3-11, 4-12, 5-13, 6-14, and 7-15. In one embodiment, signals 510 and 512 comprise four bits. Therefore, in one embodiment, adding 8 to the value of signal 510 may be achieved by setting the first bit of signal 510 is set to "1". Such an approach avoids the need to perform any addition. In the PSHUFW example above, only eight source bytes were address. However, for PSHUFD all sixteen of the source bytes 302A-320B are addressed. In order to generate the correct byte select, the source bytes 302 are generally divided into a low portion 302A and a high portion 302B. The low portion 302A corresponds to doublewords 0-1, and the high portion 302B corresponds to doublewords 2-3. If the two bits of the immediate value 522 for the unit 420A correspond to the low doubleword 302A, then signal 510 is conveyed as the select signal 550 for the unit 420A. If the two bits of the immediate value 522 correspond to the high doubleword 302B, then signal 512 is conveyed as the select signal 550 for unit 420A.

In contrast to the example of PSHUFW above where units 420 were generally grouped into groups of two, a PSHUFD instruction effectively groups units 420 into groups of four. In such a case, the least significant byte location for a doubleword may be represented by units 420A, 420E, 4201, and 420M. The second least significant byte location for a doubleword may be represented by units 420B, 420F, 420J, and 420N. The third least significant byte location for a doubleword may be represented by units 420C, 420G, 420K, and 420O. Finally, the most significant byte location for a doubleword may be represented by units 420D, 420H, 420L, and 420P. Therefore, units 420 within a group will add either 1, 2, or 3 to the determined source byte location 510 in order to address the remaining bytes of the double word. Such addition may be achieved by setting signal 514 to 1, 2, or 3 as appropriate. Of course, numerous other ways of generating the additional byte selects are possible and are contemplated.

In addition to supporting shuffle instructions, the shuffle unit 300 may be configured to support shift instructions as well. In one embodiment, shuffle unit 300 may be configured to support the x86 instructions Packed Shift Left Logical Double Quadword (PSLLDQ) and Packed Shift Right Logical Double Quadword (PSRLDQ). Generally speaking, each of the PSLLDQ and PSRLDQ instructions identify a 128-bit (16 byte) operand and a number of bytes by which the operand is to be shifted. Bytes which are emptied by the shift are cleared to zero. If the shift value is greater than 15, the operand register(s) is effectively cleared. The syntax of each of the PSLLDQ and PSRLDQ is as follows:

PSLLDQ xmm, imm8

PSLRDQ xmm, imm8 wherein xmm identifies a 128-bit source operand register, and imm8 is an 8 bit value which represents a number of bytes to shift the source operand. While xmm may represent a 128-bit implemented register, in one embodiment the identified xmm register is logically comprised of two 64 bit registers.

In one embodiment, each of the PSLLDQ and PSRLDQ instructions are translated into two sub-operations—a "low" sub-operation, and a "high" sub-operation. Each sub-operation is configured to generate the results for either the "high" half of the 128-bit destination register or the "low" half of the destination register. In one embodiment, the low sub-operation of the right shift and the high sub-operation of the left shift are two source sub-operations because the 64-bit result is a function of all 16 source bytes. On the other hand, the high sub-operation of the right shift and the low sub-operation of the left shift are single source operations because they only depend upon one half of the source. The following illustrates one embodiment of the translation of PSLLDQ and PSRLDQ instructions into sub-operations. The general format of the translated sub-operation is as follows:

shift_subop destination, src1, src2, imm8 where destination is the destination register, src1 and src2 are source register, and imm8 is the instruction immediate value. In particular, the PSLLDQ and PSRLDQ instructions may be translated into sub-operations as follows.

| PSLLDQ: | |
|---|---|
| pslldql | xmmregmlo, _, xmmregmlo, imm8 |
| pslldqh | xmmregmhi, xmmregmhi, xmmregmlo, imm8 |
| PSRLDQ: | |
| psrldql | xmmregmlo, xmmregmhi, xmmregmlo, imm8 |
| psrldqh | xmmregmhi, _, xmmregmhi, imm8 |

As seen in the example above, the PSLLDQ instruction is translated into a low sub-operation (pslldql) and a high sub_operation (pslldqh). Similarly, the PSRLDQ instruction is translated into a low sub_operation (psrldql) and a high sub-operation (psrldqh). In this example, xmm generally refers to 128 bit register, with xmmregmlo referencing the lower 64 bits of the register, and xmmregmhi referencing the upper 64 bits of the register.

The 8 bytes of src2 are configured at indices 7-0 of the shuffle mux and the 8 bytes of src1 are configured at indices 15-8 of the shuffle mux. All 128 bits of the xmm register are therefore naturally aligned at the shuffle mux inputs with byte 0 at index 0 and byte 15 at index 15. The only exception is the fkpsrldq dop which has the high xmm half on src2 to satisfy one embodiment in which single-source sub-operations use src2. The shuffle index may therefore be assigned indices 7-0 to point to the high xmm bytes instead of 15-8.

Generally speaking, shifts are mapped to shuffles by deriving a byte select for each result byte that is a function of the shift count contained in Imm (i.e., imm8[3:0]). This is arrived at by adding or subtracting the shift count (Disp) from the source byte index (Idx). The lower 4-bits of the adder output become the shuffle unit byte select. The index (Idx) is a function of the sub-operation opcode and the displacement (Disp) is a function of both the sub-operation opcode and Imm value. The carry-out of the adder, or its inversion, becomes a 5th select bit which may be used to force zeroes when appropriate. Table 1 below shows one embodiment as to how the index and displacement are configured for each sub-operation and whether an addition or a subtraction needs to be performed.

Subsequent to receiving the PSLLDQ opcode 520 and imm8 522 value, control unit 500 conveys a signal which corresponds to the byte position which corresponds to the unit (i.e., unit 420A in FIG. 5). Therefore, signal 510 conveys the value zero. In a similar manner, control units for the remaining units (420B-420P) would convey signal which correspond to their respective byte locations. In other words, signal 510 would have the value "1" for unit 420B, "2" for the unit 420C, and so on. The value 510 which is conveyed for a particular destination byte position may generally be referred to as the index of the destination byte. In one embodiment, signal 510 is generally used for destination byte positions 0-7, and signal 512 may be used for destination byte positions 8-15. Therefore, if the 16 byte destination register actually comprises two 8 byte registers, byte positions in the lower order register correspond to signal 510 and byte positions within the higher order register correspond to signal 512. Consequently, the lowest order byte (i.e., byte position zero) in the higher order register has byte position 8 when considering the 16 byte destination register as a whole.

TABLE 1

| | | | | | pslldgl | | | |
|---|---|---|---|---|---|---|---|---|
| Idx | 7 | 6 | 5 | 4 | 3 | 2 | 1 | 0 |
| Disp | Imm[3:0] | Imm[3:0] | Imm[3:0] | Imm[3:0] | Imm[3:0] | Imm[3:0] | Imm[3:0] | Imm[3:0] |
| Add/Sub | Sub | Sub | Sub | Sub | Sub | Sub | Sub | Sub |
| | | | | | pslldgh | | | |
| Idx | 15 | 14 | 13 | 12 | 11 | 10 | 9 | 8 |
| Disp | Imm[3:0] | Imm[3:0] | Imm[3:0] | Imm[3:0] | Imm[3:0] | Imm[3:0] | Imm[3:0] | Imm[3:0] |
| Add/Sub | Sub | Sub | Sub | Sub | Sub | Sub | Sub | Sub |
| | | | | | psrldgl | | | |
| Idx | 7 | 6 | 5 | 4 | 3 | 2 | 1 | 0 |
| Disp | Imm[3:0] | Imm[3:0] | Imm[3:0] | Imm[3:0] | Imm[3:0] | Imm[3:0] | Imm[3:0] | Imm[3:0] |
| Add/Sub | Add | Add | Add | Add | Add | Add | Add | Add |
| | | | | | psrldqh | | | |
| Idx | 15 | 14 | 13 | 12 | 11 | 10 | 9 | 8 |
| Disp | Imm[3:0] | Imm[3:0] | Imm[3:0] | Imm[3:0] | Imm[3:0] | Imm[3:0] | Imm[3:0] | Imm[3:0] |
| Add/Sub | Add | Add | Add | Add | Add | Add | Add | Add |

Returning now to FIG. 5, an example shift operation will be described. For purposes of discussion, a left shift (PSLLDQ) instruction will be used. In the example of FIG. 5, a PSLLDQ instruction is received for execution. Both the operand 520 and immediate value (imm8) 522 are received. In an embodiment where the 128 bit source register comprises the logical concatenation of two 64 bit registers, the lower order bytes may be represented by source bytes 302A and the higher order bytes may be represented by source bytes 302B. As may be appreciated, each of sources 320A and 302B generally correspond to a single 64 bit register. As with the shuffle operations discussed above, unit 420A is configured to convey one of the source bytes 302 for a given destination byte position (the lowest order byte position in this case) via gate 542. As noted above, a shift operation may cause a byte position to be cleared (i.e., set to zero). Accordingly, a "force to 0" unit 540 is also included in the embodiment of FIG. 5. Operation of unit 540 will be discussed below.

In the embodiment of FIG. 5, signal 512 may be generated by adding 8 to the value of signal 510. As discussed above, each of signals 510 and 512 may comprise four bits. As signal 510 may assume values from 0-7, signal 512 may be generated by simply duplicating signal 510 and setting the uppermost bit to one. In this manner, all sixteen indices (0-15) are represented by signals 510 and 512. An additional logic unit 502 may then be used to generate a select signal for multiplexor 506 which conveys the appropriate index for the unit. In the case of FIG. 5 where unit 420A is depicted, unit 420A corresponds to the least significant destination byte (i.e., byte position zero). As byte position zero corresponds to the lower order destination register, logic 502 conveys a signal which selects signal 510 for conveyance. Similarly, signal 510 would be conveyed for units 420B-420H. Signal 512 would be conveyed for units 420I-420P. The conveyed index is conveyed to adder 511.

Also conveyed by control unit 500 is a signal 514 which corresponds to the imm8 value 522 representing the number of bytes the source operand is to be shifted. As the maximum number of bytes the operand may be shifted without completely clearing the operand is 15, bits 3:0 of signal 514 may generally represent the shift value. Bits 3:0 of signal 514 are conveyed to multiplexor 508, as well as the inverse of bits 3:0 as shown in FIG. 5. Bits 7:4 are conveyed as signal 532 to the "force to 0" unit 540. In addition, an indication of the type of operation as indicated by the opcode 520 is conveyed to unit 540 as signal 534. Generally speaking, signal 534 represents an enable signal for the "force to 0" unit 540. Signal 534 will enable unit 540 for shift operations, and disable unit 540 for shuffle operations. In general, force to zero logic 540 will convey a negated signal 541 if the enable signal 534 is asserted and one of the following conditions occurs: (1) any of the bits of signal 532 are asserted (which would indicate a shift greater than 15); (2) an addition which results in a value greater than 15; or (3) a subtraction which results in a value less than zero. Each of these scenarios represent situations in which the current destination byte will be cleared.

In addition to the above, logic unit 504 is included in the embodiment shown in FIG. 5. Logic unit 504 conveys a signal which indicates whether a left shift is indicated, or a right shift. If a left shift is indicated, signal 505 is used to select the non-inverted input for conveyance from mux 508. Alternatively, if a right shift is indicated, signal 505 selects the inverted input for conveyance from mux 508. Generally speaking, a left shift indicates that the shift value (imm8 522) is to be subtracted from the index of the destination byte (510 or 512, as appropriate), and a right shift indicates that the shift value is to be added to the index of the destination byte. Signal 505 may also be used to indicate to adder 511 whether an addition or subtraction is actually being performed. Adder 511 conveys a carryout signal 530 which is set if an addition results in a value greater than 15, or is zero if a subtraction results in a value less than zero. Select signal 550 conveyed from adder 511 selects one of the source bytes 302 for conveyance from mux 552.

As a specific example, assume a PSLLDQ instruction with immediate value of 4 (binary 00000100). Signal 510 in FIG. 5 will be 0 (which corresponds to unit 420A) and signal 512 will be 8. Logic 502 will select signal 510 for conveyance from mux 506 to adder 511. Signal 514 will comprise the value 4. Bits 3:0 (0100) will be conveyed to mux 508. In addition, bits 3:0 will be inverted (i.e., 1011) and applied to mux 508. Signal 532 will convey bits 7:4 (0000 in this case), and signal 534 will be asserted (to indicate a shift operation) and will enable force to zero unit 540. Logic unit 504 will the convey a signal 505 which indicates a left shift (subtraction) operation to both mux 508 and adder 511. In response, mux 508 will convey the inverted value (1011) to the adder 511. In addition, adder 511 will receive the indication 505 that a subtraction (two's complement addition) is being performed. Therefore, adder 511 will perform the operation 0000+1011+1=(0) 1100 [which is equivalent to 0000-0100]. As a subtraction is being performed, and the carryout is zero (0), a negative value is indicated. Logic 540 then receives this indication and, since logic 540 is currently enabled, negates signal 541 which forces the output of gate 542 to zero.

In the example above, a left shift was performed and the unit 420A corresponds to the least significant byte. Therefore, as may be appreciated, any left shift greater than zero will cause the least significant byte position to be forced to zero. However, assume now the same scenario as above wherein a PSLLDQ instruction is received with immediate value of four. In this case, rather than unit 420A, assume unit 420F were the unit depicted in FIG. 5. Unit 420F corresponds to the sixth least significant byte position (i.e., destination byte 5). Therefore, signal 510 would have the value 5 which would be conveyed to adder 511. Adder 511 would perform the operation 5-4 by performing the two's complement addition 0101-1101+1=(1) 0001. As a subtraction resulted in a carryout of 1, a negative value is not indicated and unit 540 does not force a zero. Rather, the adder 511 result (0001) is conveyed as a select signal which selects byte 1 (S2[1]) for conveyance via gate 542.

As an example of a value being shifted from the lower half of a 128 bit register to an upper half of a 128 bit register, assume again a PSLLDQ instruction with immediate value of 4 (binary 00000100). Signal 510 in FIG. 5 will be 0 (which corresponds to unit 420I which is the lowest byte in the high portion of the register) and signal 512 will be 8. Logic 502 will select signal 512 for conveyance from mux 506 to adder 511. Signal 514 will comprise the value 4. Bits 3:0 (0100) will be conveyed to mux 508. In addition, bits 3:0 will be inverted (i.e., 1011) and applied to mux 508. Signal 532 will convey bits 7:4 (0000 in this case), and signal 534 will be asserted (to indicate a shift operation) and will enable force to zero unit 540. Logic unit 504 will the convey a signal 505 which indicates a left shift (subtraction) operation to both mux 508 and adder 511. In response, mux 508 will convey the inverted value (1011) to the adder 511. In addition, adder 511 will receive the indication 505 that a subtraction (two's complement addition) is being performed. Therefore, adder 511 will perform the operation 1000+1011+1=(1) 0100 [which is equivalent to 0000–0100]. As a subtraction is being performed, and the carryout is one (1), a positive value is indicated. Logic 540 then receives this indication and, since logic 540 is currently enabled, asserts signal 541. Byte select signal Sel[3:0] conveys the binary value "0100" which selects byte four (S2[4]) for conveyance. Therefore, byte four (S2[4]) has successfully been shifted left by four to the lowest byte position of the high half of the destination register (i.e., the position corresponding to unit 420I).

In the case of a PSRLDQ instruction, a right shift is performed. In the embodiment of FIG. 5, logic unit 504 would convey an indication 505 corresponding to a right shift which would select the non-inverted input for conveyance from mux 508. In addition, signal 505 would indicate to adder 511 that an addition is being performed. If an addition performed by adder 511 results in a carryout of "1", then an overflow is indicated which will cause unit 540 to negate signal 541 and force the output of gate 542 to zero. Otherwise, one of the source bytes 302 will be conveyed via gate 542.

It is noted that in the case of a left shift, the eight lower order destination bytes may generally ignore source bytes of the higher order register. This is possible as the resulting values in the lower order destination byte positions during a left shift can only come from the lower order bytes, or are cleared to zero. Similarly, for a right shift, the eight higher order destination bytes may generally ignore the lower order register bytes.

Numerous variations and modifications will become apparent to those skilled in the art once the above disclosure is fully appreciated. It is intended that the following claims be interpreted to embrace all such variations and modifications.

What is claimed is:
1. A method comprising:
receiving an instruction comprising an opcode, a source operand identifier, and an immediate value;
determining whether the instruction corresponds to a shuffle instruction or a shift instruction;

in response to determining the instruction corresponds to a shuffle instruction:
  using particular bits of the immediate value to select data in a byte position of the source operand for relocation to a byte position which corresponds to the position of the particular bits in the immediate value;
in response to determining the instruction corresponds to a shift instruction:
  performing an arithmetic operation on a first value and a second value, wherein the first value comprises bits of the immediate value and the second value comprises an index which corresponds to a destination byte position;
  in response to determining the instruction corresponds to a left shift, said arithmetic operation comprises subtracting the first value from the second value;
  in response to determining the instruction corresponds to a right shift, said arithmetic operation comprises adding the first value to the second value; and
  using a result of said arithmetic operation to select data in a byte position of the source operand for relocation to the destination byte position.

2. The method of claim 1, wherein the source operand comprises sixteen bytes, and wherein the method further comprises:
  forcing a value of said destination byte to zero in response to detecting any of:
  said immediate value comprises a value greater than fifteen;
  the arithmetic operation results in a negative value; or
  the arithmetic operation results in value greater than fifteen.

3. The method of claim 2, wherein the source operand comprises the logical concatenation of a lower order eight byte operand and a higher order eight byte operand, wherein byte positions of the lower order eight byte operand are numbered 0-7, and wherein byte positions of the higher order eight byte operand are numbered 8-15.

4. The method of claim 3, wherein said index comprises four bits, and wherein the highest order bit of the index is forced to the binary value 1, in response to determining the destination byte position corresponds to the higher order eight byte operand.

5. The method of claim 1, wherein subtracting the first value from the second value comprises adding a two's complement of selected bits of the first value to the second value.

6. The method of claim 5, wherein the selected bits comprise the least significant four bits of the immediate value.

7. A processor comprising:
  a decode unit; and
  an execution core, wherein the execution core is configured to:
    receive from the decode unit an instruction comprising an opcode, a source operand identifier, and an immediate value;
    determine whether the instruction corresponds to a shuffle instruction or a shift instruction;
    in response to determining the instruction corresponds to a shuffle instruction: use particular bits of the immediate value to select data in a byte position of the source operand for relocation to a byte position which corresponds to the position of the particular bits in the immediate value;
    in response to determining the instruction corresponds to a shift instruction:
      perform an arithmetic operation on a first value and a second value, wherein the first value comprises bits of the immediate value and the second value comprises an index which corresponds to a destination byte position;
      in response to determining the instruction corresponds to a left shift, said arithmetic operation comprises subtracting the first value from the second value;
      in response to determining the instruction corresponds to a right shift, said arithmetic operation comprises adding the first value to the second value; and
      use a result of said arithmetic operation to select data in a byte position of the source operand for relocation to the destination byte position.

8. The processor of claim 7, wherein the source operand comprises sixteen bytes, and wherein the core is further configured to:
  force a value of said destination byte to zero in response to detecting any of:
    said immediate value comprises a value greater than fifteen;
    the arithmetic operation results in a negative value; or
    the arithmetic operation results in value greater than fifteen.

9. The processor of claim 8, wherein the source operand comprises the logical concatenation of a lower order eight byte operand and a higher order eight byte operand, wherein byte positions of the lower order eight byte operand are numbered 0-7, and wherein byte positions of the higher order eight byte operand are numbered 8-15.

10. The processor of claim 9, wherein said index comprises four bits, and wherein the highest order bit of the index is forced to the binary value 1, in response to determining the destination byte position corresponds to the higher order eight byte operand.

11. The processor of claim 8, wherein the core is configured to subtract the first value from the second value comprises by adding a two's complement of selected bits of the first value to the second value.

12. The processor of claim 11, wherein the selected bits comprise the least significant four bits of the immediate value.

13. A shuffle unit comprising:
  an input configured to receive a source operand; and
  an output configured to convey data bytes corresponding to a plurality of destination byte positions; and
  control circuitry, wherein the control circuitry is configured to:
    receive an instruction comprising an opcode, a source operand identifier, and an immediate value;
    determine whether the instruction corresponds to a shuffle instruction or a shift instruction;
    in response to determining the instruction corresponds to a shuffle instruction: use particular bits of the immediate value to select data in a byte position of the source operand for relocation to a byte position which corresponds to the position of the particular bits in the immediate value;
    in response to determining the instruction corresponds to a shift instruction:
      perform an arithmetic operation on a first value and a second value, wherein the first value comprises bits of the immediate value and the second value comprises an index which corresponds to a destination byte position; and in response to determining the instruction corresponds to a left shift, said arithmetic operation comprises subtracting the first value from the second value;

in response to determining the instruction corresponds to a right shift, said arithmetic operation comprises adding the first value to the second value;

use a result of said arithmetic operation to select data in a byte position of the source operand for relocation to the destination byte position.

14. The processor of claim 13, wherein the source operand comprises sixteen bytes, and wherein the circuitry is further configured to force a value of said destination byte to zero in response to detecting any of:

said immediate value comprises a value greater than fifteen;

the arithmetic operation results in a negative value; and the arithmetic operation results in value greater than fifteen.

15. The processor of claim 14, wherein the source operand comprises the logical concatenation of a lower order eight byte operand and a higher order eight byte operand, wherein byte positions of the lower order eight byte operand are numbered 0-7, and wherein byte positions of the higher order eight byte operand are numbered 8-15.

16. The processor of claim 15, wherein said index comprises four bits, and wherein the highest order bit of the index is forced to the binary value 1, in response to determining the destination byte position corresponds to the higher order eight byte operand.

17. The processor of claim 14, wherein the circuitry is configured to subtract the first value from the second value comprises by adding a two's complement of selected bits of the first value to the second value.

* * * * *